United States Patent

[11] 3,621,984

| [72] | Inventor | Willie K. Grassauer |
| | | Menlo Park, Calif. |
| [21] | Appl. No. | 792,000 |
| [22] | Filed | Jan. 17, 1969 |
| [45] | Patented | Nov. 23, 1971 |
| [73] | Assignee | Raychem Corporation |
| | | Menlo Park, Calif. |

[54] CLAMPING MECHANISM
18 Claims, 3 Drawing Figs.

| [52] | U.S. Cl. | 198/179 |
| [51] | Int. Cl. | B65g 17/46 |
| [50] | Field of Search | 198/179, 180, 210; 214/1 B; 294/116 |

[56] References Cited
UNITED STATES PATENTS

| 2,530,412 | 11/1950 | Wallace | 198/179 |
| 3,008,751 | 11/1961 | Morrill | 294/116 X |
| 3,516,533 | 6/1970 | Schenkel et al. | 198/179 |

Primary Examiner—Robert G. Sheridan
Attorney—Lyon & Lyon

ABSTRACT: A clamping mechanism automatically adjusts to hold an article with the particular predetermined amount of force desired at each of a plurality of stations to which it is passed by a conveyor system.

INVENTOR.
WILLIE K. GRASSAUER

INVENTOR.
WILLIE K. GRASSAUER
BY
Lyon & Lyon
ATTORNEYS

CLAMPING MECHANISM

BACKGROUND OF THE INVENTION

When working on a clamped article, it is frequently desirable to control the amount of force applied to the article by the clamp. This is particularly true of articles which are relatively fragile and might be damaged if an excessive amount of force is applied to the article. On the other hand, if an insufficient amount of force is applied to the article it might slip or move during an operation on the article. Manual adjustment of the clamp is always subject to the possibility of error, since it depends in part on the skill of the operator, and is very time consuming, particularly if the amount of force applied must be varied between various operations on an article.

Therefore, it is the primary object of this invention to provide a clamp device which will automatically apply to an article only that amount of desired force which will sufficiently grip without damaging the article. In accordance with this object, it is desirable that the clamped article can be moved to various operating stations while a desired clamping force and the position of the article in the clamp are maintained.

A further object of this invention is to provide a means for automatically changing the amount of force applied by the clamp device to the article at or between the different operating stations. Moreover, it is desirable that the clamp device is such that the article can be readily inserted into it and removed as required.

Other and further objects and advantages of this invention will be made readily apparent from the accompanying drawings and following detailed description.

SUMMARY OF THE INVENTION

Briefly, the present invention includes a clamp or a plurality of clamps which are adapted to be carried by a conveyor belt along a predetermined path. Each clamp includes a pair of article gripping jaws operably connected to a base which is attached to the conveyor belt, one of the jaws being movable with respect to the base. Also included is a guide member having two opposite and parallel sides, with each side adjacent to the conveyor belt and the path of the clamps and having a lower horizontal groove and an upper guide rail. The base of the clamp is provided with wheels on each side to ride in the horizontal grooves of the sides of the guide member and rollers are provided on each side of the movable jaw to run along the upper guide rails. A change in the elevation of the guide rails effects a change in the amount of force applied by the jaws to the article.

Referring now in detail to the drawings, the clamp devices, generally designated 10, are adapted to be carried in the conveyor system at spaced intervals on an endless conveyor belt or chain 11 having a plurality of links. Although not shown, it is contemplated that two sprocket wheels will engage the endless chain 11; one of the wheels will be driven by an electric motor and the other wheel will act as an idler wheel. One wheel will be positioned at each end of the conveyor system so that two horizontal lengths of the chain 11, one above the other, will be between the sprocket wheels. It is further contemplated that a machine or machines will be positioned adjacent the conveyor system, each machine having a plurality of stations where various operations will be performed on the clamped article. It will be appreciated that each operation subjects the clamped article to a certain amount of force of one type or another. However, these operations form no part of the present invention and therefore will not be described in detail, nor will they be illustrated.

Figures 2, 3:
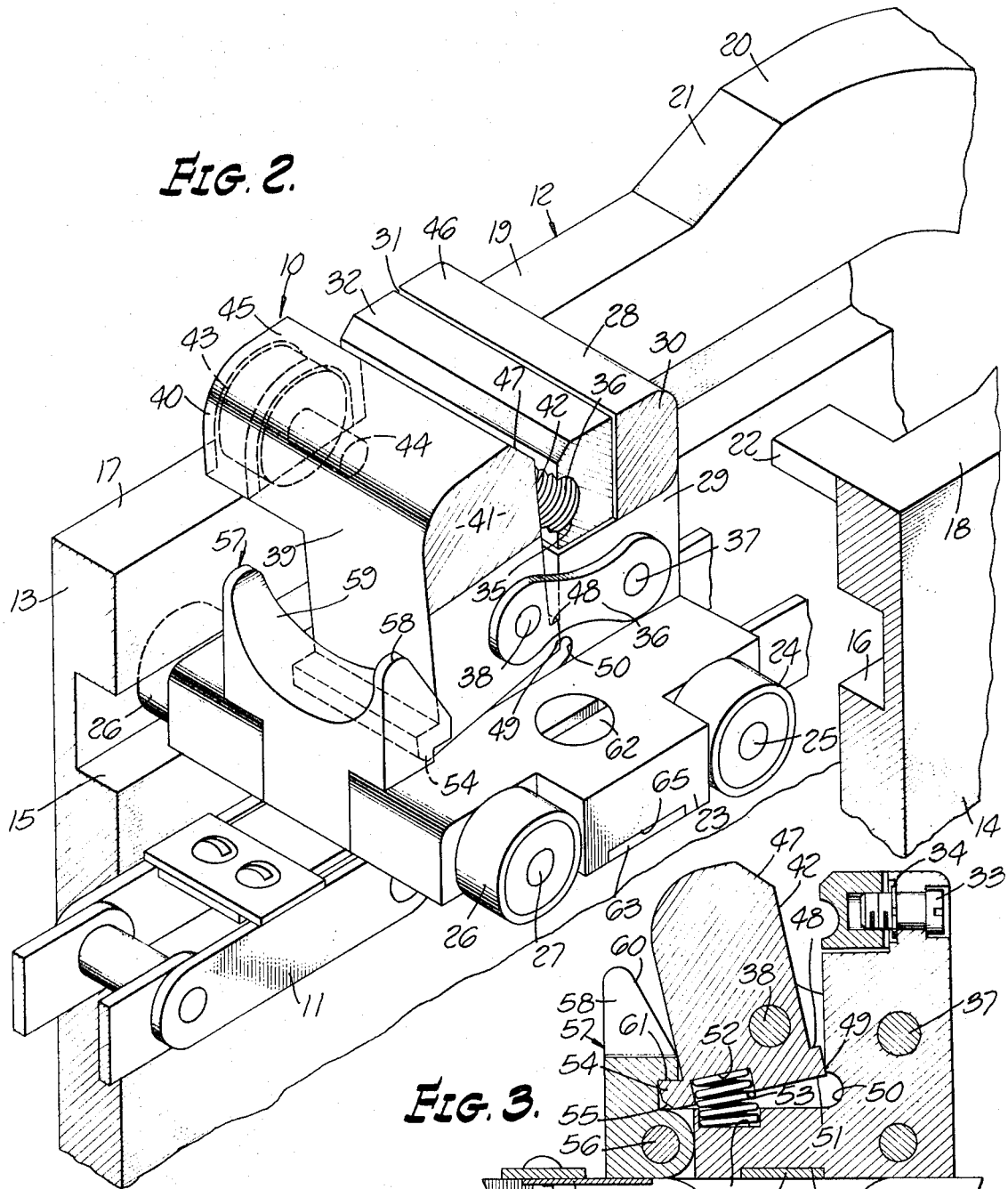
FIG. 2 is a perspective view, partly in section and partly broken away, of a clamp attached to a conveyor belt and engaging a guide member.
FIG. 3 is a side elevation of the clamp in section.

In close proximity to the area where the operations are performed, a guide member, generally designated 12, will be located. The guide member 12 includes two opposite sidewalls 13 and 14, one on each side of and adjacent to the upper horizontal length of the chain 11. On the inner face of each of the walls 13 and 14 are square cut grooves 15 and 16, respectively, running parallel to but slightly above the chain 11. Moreover, the grooves 15 and 16 are parallel to and opposite each other. The upper face of each of the walls 13 and 14 forms parallel and opposite guide rails or cam surfaces 17 and 18, respectively. The elevation of the guide rails 17 and 18, varies along the length of the guide member 12. As seen in FIG. 2, the guide rail 17 comprises two levels 19 and 20, each of a different elevation, joined by a short ramp 21. Although not shown, it should be recognized that the guide rails can comprise any number of levels of any particular elevation. It should be further recognized that the variations in the elevations of each of the guide rails 17 and 18 are typically the same on each side of the guide member 12. Also, the guide member can be extended around the upper half of the sprocket located at the end of the upper horizontal length, with the grooves 15 and 16 and the rails 17 and 18 maintaining a constant distance from the chain 11. On the inner face of wall 13 above the grooves 16 and near the beginning of the guide member 12 is a projecting member or trip 22.

As will be seen most clearly in FIGS. 2 and 3, each clamp 10 includes a generally rectangular base 23 which carries a pair of front wheels 24 mounted on a pair of stub axles 25 and a pair of back wheels 26 mounted on a pair of stub axles 27. Each wheel is located in a corner of the base 23 and is adapted to ride in one of the grooves 15 or 16.

Extending vertically upward from the front portion of the base 23 is a rigidly fixed pillar 28 which may be integral with the base 23. The pillar 28 includes a base 29 and an upper portion 30 which extends outwardly on each side over and slightly above the guide rails 17 and 18. The rear half of the upper portion 30 is notched at 31 to receive a first and fixed jaw member 32 which is the same length as the upper portion 30. The jaw member 32 is mounted to the pillar 28 by a threaded member 33 which extends through a central opening in the upper portion 30 of the pillar. The threaded member 33 can be turned to move the jaw member 32 horizontally in the notch 31 for adjustment purposes. A lock washer 34 prevents loosening of the threaded member 33.

The rear vertical face of the jaw member 32 includes a horizontal groove 35 which is generally semicircular in cross section to receive a cylindrical article such as a coaxial cable. However, it should be noted that the shape of the rear vertical face of jaw member 32 can be adapted to receive an article of a different shape. Serrations 36 are provided in the groove 35 for gripping purposes.

The pillar 28 carries a pair of links or bellcranks 36, each having one end pivotally attached at 37 to a side of the base portion 29 and the opposite end pivotally attached at 38 to a side of a second pillar 39. The sides 40 of the upper portion of the pillar 39 extend outwardly over and slightly above the guide rails 17 and 18 to form a second and movable jaw member 41 having a vertical face 42 which is adjacent to and the same width as the jaw member 32. The sides 40 are each recessed to receive a roller or cam follower 43 mounted on a stub axle 44. The rollers are adapted to run on the guide rails 17 and 18. The top face 45 of the pillar 39 is higher than the top face 46 of the pillar 28 and the edge between the top face 45 and the vertical face 42 is removed to provide a beveled face 47.

The bottom front edge of the pillar 39 extends outward at 48 and contacts the rear face of the pillar 28 and the bottom portion of the rear face of the pillar 28 is recessed at 50 to allow the pillar 39 to freely pivot about the edge 49.

The bottom face 51 of the pillar 39 has formed therein a shallow cylindrical depression 52 which forms a cup for one end of a compression spring 53. A similar depression 54 is formed in the upper face of the base 23 to receive the other end of the spring 53. The spring 53 acts to urge the pillar 39 upwardly. The bottom face 51 of the pillar 39 is extended at the edge remote from the pillar 28 to form a projecting by or ledge 54, the bottom edge of the ledge being latch member away to form a small beveled face 55.

Pivotally mounted at 56 on the rear end of the base 23 is an upstanding latch member, indicated generally by the reference numeral 57, having an upper portion 58 which is wedge shaped and recessed at 59. This recessed portion 59 is adapted to receive the thumb of an operator. The front face 60 of the wedge-shaped portion 58 extends downwardly and its bottom edge 61 is capable of overlying the ledge 54 and prevent upward movement of the pillar 39.

The base 23 of each clamp 10 is mounted to the conveyor chain 11 by means of screws 62 which are threadably connected to a transverse projection 63 on the link 64 of the chain 11. The bottom face of the base 23 is recessed at 65 to receive the transverse projection 63. Connected to the transverse projection 63 on the next succeeding link 66 is a spring plate 67, the front end of which underlies the base 23 of the clamp adjacent to the bottom of the member 57. It is generally contemplated that the clamps 10 will be spaced such that every alternate link will carry a clamp, and every intervening link will carry a spring plate 67.

Figure 1:
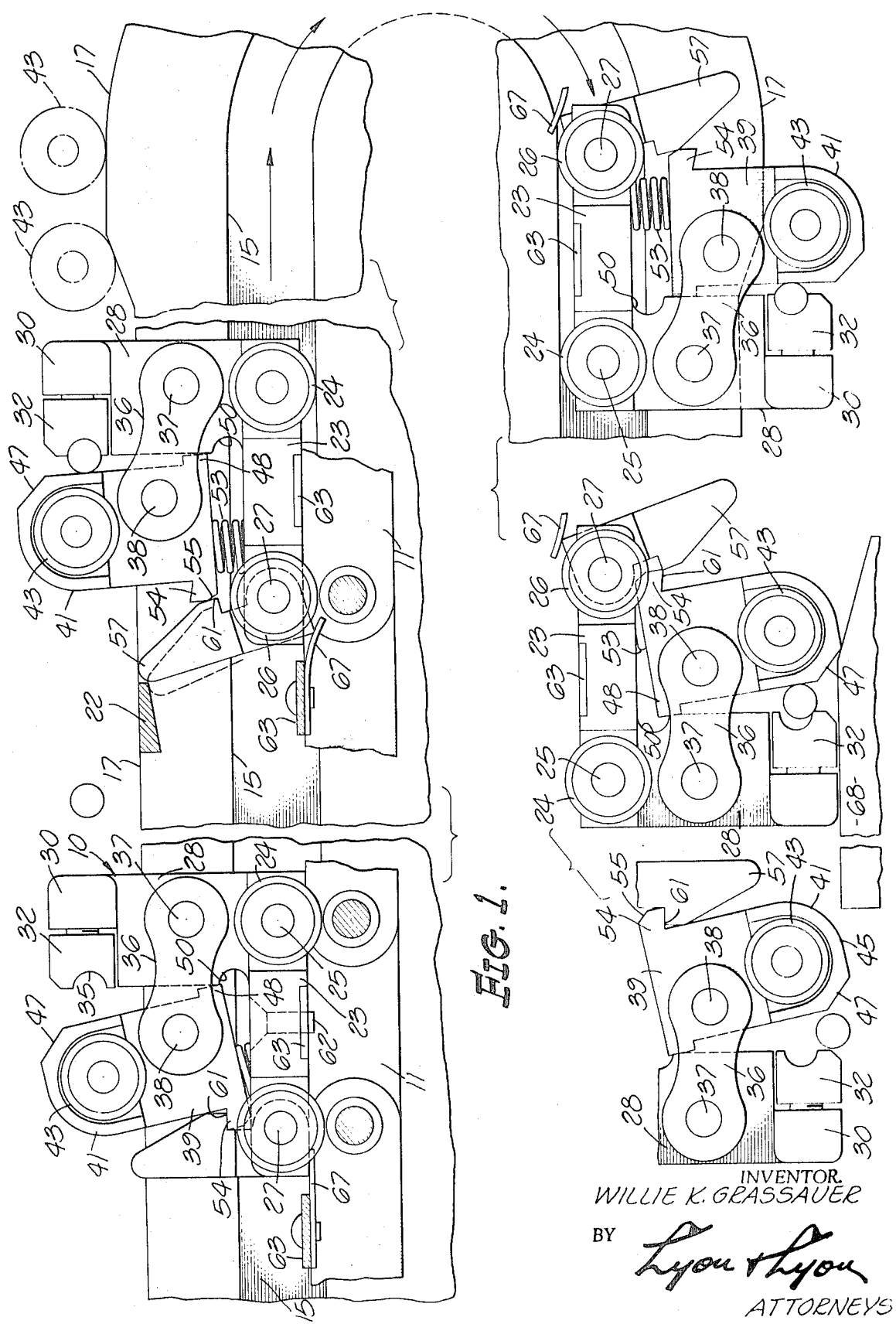
FIG. 1 is a side elevation schematically illustrating the clamp as it is moved through various stages in the conveyor system.

The operation of the device is best seen in FIG. 1. FIG. 1 shows the clamp device 10 moving through each step of one complete cycle of operation; however, it should be recognized that in the typical conveyor system contemplated several of the steps might be repeated in a cycle of operation and there might be several cycles of operation within the one conveyor system all depending on the operations to be performed and the machinery used.

In operation the clamp devices 10 are passed through the conveyor system by the chain 11 which is moved by one of the two sprockets, which in turn is driven by an electric motor. As first seen in FIG. 1, each clamp device is normally maintained in an "open" position. In the open position, the pillar 39 is pivoted counterclockwise to partially compress the spring 53. The pillar 39 is held in this position by bottom edge 61 of the member 57 which overlies the lip 54 of the pillar 39. This position is maintained as the clamp device 10 first enters a guide member 12 and the wheels 24 and 26 begin to ride in the grooves 15 and 16 and the rollers 43 begin to ride on the guide rails 17 and 18. Either sometime before or shortly after the clamp device 10 enters the guide member 12, the article to be clamped is placed between the open jaw members 32 and 41. After the article has been positioned the clamp 10 passes the trip 22 which engages the front face 60 of the latch member 57. The member 57 is thereby pivoted at 56 counterclockwise causing its bottom edge 61 to become disengaged with the ledge 54 and allowing the spring 53 to push the pillar 39 upward. This same step can also be accomplished manually by the operator pushing on the recessed portion 59 of the latch member 57.

The spring plate 67, which has been pressed down by the pivoting of the latch member 58, acts on the latch member 58 which in turn presses on the small beveled face 55 to cause the pillar 39 to rotate clockwise. This clockwise motion closes the jaw members sufficiently to hold the article steady without damaging the article. This resilient clamping force, however, may not be sufficient to properly grip the article during an operation on the article and preferably an additional positive mechanical force is used to grip the article during an operation. This is accomplished as the clamp continues to progress through the guide member 12 by raising the rollers 43 which position the jaw member 41 to another level of higher elevation on the guide rails 17 and 18 while maintaining the wheels 24 and 26 which position the jaw member 32 in the grooves 15 and 16 at a constant level. In other words, the raising of the rollers 43 raises the pillar 39 and, since the pillar 39 is mounted on the pivoting links 36, further lessens the distance between the jaw members 32 and 41. The rollers 43 are moved to the various levels by the use of short ramps, such as the ramp 21 shown in FIG. 2. Moreover, because the amount of force applied by jaw members 32 and 41 to the article is dependent in part on the distance the pillar 39 is raised, the exact amount of force desired will be applied and maintained by increasing the elevation of the level on which the rollers 43 ride a predetermined distance. Also because of the bell crank arrangement, a relatively large upward movement of the pillar 39 results in only a relatively small closing of the distance between the jaw members 32 and 41 to aid in the precise control of the closing of the jaw members and amount of force exerted by the jaw members on the clamped article.

When clamping articles having substantial length, such as a cable, the pressure exerted on the article can be decreased or increases without changing the mechanical clamping force by merely increasing or decreasing the width of the jaw members 32 and 41. Further, the degree of increase in the amount of force applied to the article can be controlled by controlling the angle of incline of the ramp. Another advantage of the device is that the mechanical clamping force can be used to perform an operation on the article, such as stamping it with the name or mark.

After the article has been clamped and all the desired operations have been performed, the clamp device 10 is normally passed from the guide member 12 with the article held in position only be the resilient clamping force of the spring plate 67 and the compression spring 53. To automatically return the clamp device 10 to its so-called "open" position, a block 68, as seen in FIG. 1, is so positioned in the conveyor system that a tapered portion 69 of the upper face of the block 68 will strike the beveled face 47 of the pillar 39 and force the pillar 39 to pivot counterclockwise until top face 45 of the pillar 39 is in contact with the upper surface of the block 68. This causes the beveled face 55 to slide along the face 60 of the latch member 57 until the ledge 54 is again caught by the edge 61 of the latch member 57, thereby holding the jaw members 41 and 32 apart and allowing removal of the article. This step may be accomplished when the clamp device 10 is on the lower horizontal chain length and upside down; if so, gravity will cause the article to automatically free itself of the clamp device 10. Moreover, this step of opening the clamp device 10 can be manually accomplished by an operator whenever the rollers 43 are not riding on an elevated level. Once the clamp device 10 has been automatically opened and the article removed, the clamp device 10 continues to move in the conveyor system over the other sprocket until it is again on the upper horizontal chain 11 and ready to repeat the cycle.

This invention clamps an article with a positive predetermined force which can be automatically varied for various operations to be performed on the article. Furthermore, it assures proper gripping of an article during each operation while reducing the possibility of damage to the article.

I claim:

1. A clamping device comprising: a clamp having a movable jaw member and a fixed jaw member; a guide member; means to cause relative movement between said clamp and said guide member; first positioning means operably connected to said fixed jaw member and second positioning means operably connected to said movable jaw member; means on said guide member associated with at least one of said positioning means to vary the distance between said jaw members; and said first positioning means and said second positioning means cooperating with said guide member during said relative movement to controllably maintain a distance between said jaw members.

2. A clamping device comprising: a clamp having a movable jaw member and a fixed jaw member; a guide member; means to cause relative movement between said clamp and said guide member; first positioning means operably connected to said fixed jaw member and second positioning means operably connected to said movable jaw member; means on said guide member associated with at least one of said positioning means to vary the distance between said jaw members; said first positioning means and said second positioning means cooperating with said guide member during relative movement to controllably maintain a distance between said jaw members; and a link on each side of said jaw members pivotally connecting said moving jaw member to said fixed jaw member.

3. The device of claim 1, wherein said first positioning means comprises rotatably mounted wheels and said second positioning means comprises cam follower means.

4. A clamping device, comprising: a clamp having a movable jaw member and a fixed jaw member; a guide member including a groove on each side of said clamp and a rail on each side of said clamp; means to cause relative movement between said clamp and said guide member; first positioning means operably connected to said fixed jaw member and second positioning means operably connected to said movable jaw member; cam means on said guide member associated with at least one of said positioning means for changing the distance between said jaw members; said first positioning means comprising rotatably mounted wheels and said second positioning means comprising cam follower means; and said first positioning and said second positioning means cooperating with said guide member during said relative movement to control the distance between said jaw members.

5. The device of claim 4, wherein said wheels are adapted to ride in said grooves and said cam follower means are adapted to run on said rails.

6. A clamping device, comprising: a clamp having a movable jaw member and a fixed jaw member; a guide member including a groove on each side of said clamp and a rail on each side of said clamp with the distance between said rail and said groove on each side of said clamp varying means to cause relative movement between said clamp and said guide member; first positioning means operably connected to said fixed jaw member and second positioning means operably connected to said movable jaw member; said first positioning means comprising rotatably mounted wheels and said second positioning means comprising cam follower means; and said first positioning and said second positioning means cooperating with said guide member during said relative movement to control the distance between said jaw members.

7. The device of claim 6, wherein the distance between said rail and said groove varies the same amount on each side of said clamp.

8. A clamping device, comprising: A clamp having a movable jaw member and a fixed jaw member, said clamp including bias means urging said jaw members towards each other and a catch operable to restrain said jaw members from approaching each other; a guide member; means to cause relative movement between said clamp and said guide member; first positioning means operably connected to said fixed jaw member and second positioning means operably connected to said movable jaw member; means on said guide member associated with at least one of said positioning means to vary the distance between said jaw members; and said first positioning means and said second positioning means cooperating with said guide member during said relative movement to control the distance between said jaw members.

9. The device of claim 8, wherein said guide member includes a trip cooperable with said clamp to move said catch to a nonoperable position.

10. The device of claim 8, wherein means are provided which are cooperable with said clamp to overcome said bias means and move said catch to an operable position.

11. The device of claim 1, wherein said means causing said relative movement comprises an endless conveyor chain connected to said clamp, a driving sprocket operably engaging said chain and an idler sprocket operably engaging said chain.

12. The device of claim 1, wherein a plurality of clamps are used.

13. A clamping device for use in a conveyor system having an endless conveyor belt mounted between two sprockets to form an upper and a lower horizontal belt level, comprising:
a plurality of clamps mounted at equispaced positions along said belt;
a guide member having parallel sides positioned on each side and adjacent to the upper horizontal belt level, each side having a lower groove and an upper rail a varied distance apart;
each said clamp including a base, a first jaw member and a second jaw member, said first jaw member rigidly secured to said base, link means pivotally connecting said second jaw member to said first jaw member and allowing said second jaw member to move relative to said first jaw member, guide wheels rotatably mounted on each side of said base and adapted to ride in said lower grooves, and guide rollers rotatably mounted on each side of said second jaw member and adapted to run on said upper rails; and
whereby said second jaw member of each said clamp is moved relative to said first jaw member when the conveyor belt moves each said clamp relative to said guide member.

14. The device of claim 13, wherein said clamps each include biasing means to urge said second jaw member towards said first jaw member.

15. The device of claim 13, wherein a latch member is pivotally mounted to said base and is operably to prevent movement of said second jaw member towards said first jaw member.

16. A clamping device, comprising:
a clamp having a movable jaw member and a fixed jaw member;
a guide member;
means to cause relative movement between said clamp and said guide member;
first follower means operably connected to said movable jaw member and second follower means operably connected to said fixed jaw member, said first and second follower means positioned on said guide member; and
said guide member adapted to change the relative positions of said first and second follower means during said relative movement to correspondingly space said jaw members a desired distance apart.

17. The device of claim 16, wherein said guide member is adapted to change the relative positions of said first and second follower means periodically during said relative movement.

18. The device of claim 17, wherein said periodic changes of the relative position of said first and second follower means periodically spaces said jaw members a variety of desired distances apart.

* * * * *